Inventor
Roger C. Camp
by Dawson, Tilton, Fallon,
Lungmus & Alexander Attys

Inventor
Roger C. Camp
by Dawson, Tilton, Fallon, Lungmus & Alexander Attys

Inventor
Roger C. Camp
by Dawson, Tilton, Fallon,
Lungmus & Alexander Attys

United States Patent Office 3,233,230
Patented Feb. 1, 1966

3,233,230
MAGNETIC RECORDING DEVICE UTILIZING A VARIABLE RELUCTANCE HEAD AND A PARAMETRON

Roger C. Camp, Ames, Iowa, assignor to Iowa State University Research Foundation, Inc., Ames, Iowa, a corporation of Iowa Filed May 4, 1962, Ser. No. 192,419
1 Claim. (Cl. 340—174.1)

This invention relates to a magnetic recording device, and, more particularly, to a device including a variable reluctance head for reading magnetic records.

This instant invention finds utility in connection with digital computers. The basic problem of getting information into and out of the digital computer at speeds compatible with the great electronic speeds possible has been one of fundamental importance to the computer industry for some time. An adjacent problem, of almost equal importance, is the preparation of information prior to use by the computer. For example, one commercial firm offers a very complex piece of peripheral equipment which is capable of reading, as would a television camera, an entire page of printed material directly. However, the bulk of existing systems used paper tape, punch cards, or magnetic tape for input and output. Although still incompatible with most machines, the magnetic tape is capable of the greatest speed of these three media. In spite of its greater speed capability, the magnetic tape or record system has several drawbacks. These are: the cost of the necessary mechanical equipment to effect the large acceleration and deceleration required, the cost of retrieving information from magnetic tape to a form suitable for human use, and the complexity of preparing tapes for use by the computer.

It is an object of this invention to provide a system which utilizes two electronic devices that provide a solution to the foregoing problem. Another object is to provide such a system which involves a variable reluctance read head and a parametron.

The variable reluctance read head is a device which depends upon an electronic means of generating a change of flux linking the read winding and the magnetic record. This is an improvement over relying upon a mechanical means to obtain the same change in flux linkages with time. An inherent advantage is that the change can be effected more rapidly, and hence a larger voltage magnitude is possible. The variable reluctance head allows the reading of magnetically-recorded information while the relative velocity of the head and record is zero, up to an upper limit which is as yet undetermined. The resulting information from the head is phase information which makes the parametron a suitable adjunct. The parametron is capable of large amplification of the two distinct phases of read head output at extremely low cost.

The parametron is a device which offers voltage gains up to approximately 100 decibels. This device consists, for one configuration, of two small magnetic cores and a capacitor. The output voltage is at one particular frequency and is furthermore in one of two possible phases. By virtue of this two-state property, it is especially suited to a two-state system of logic as used in most digital computers.

From the foregoing, it can be seen that another object of the invention is to provide new apparatus for use in connection with digital computers, particularly an arrangement which makes use of binary phase information. Other objects and advantages of the invention may be seen in the details of construction and operation set down in this specification.

This invention will be described in conjunction with an illustrative embodiment in the accompanying drawing, in which—

Figure 1:
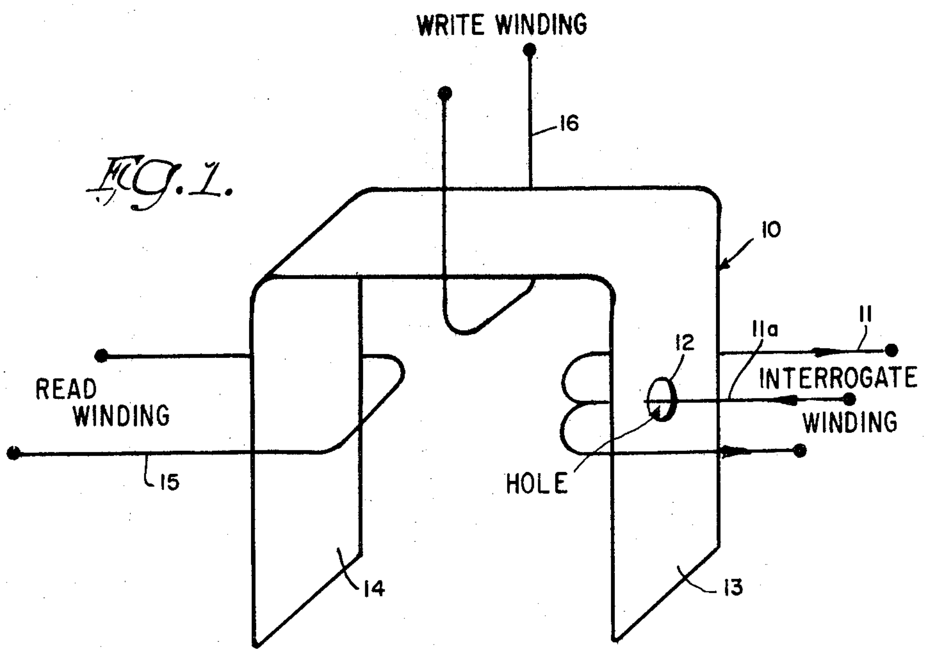
FIG. 1 is a schematic representation of a variable reluctance read head.

Although several forms of the variable reluctance head are useful, some are easier to construct mechanically than others. In FIG. 1, it is seen that the horseshoe type of head is employed.

*Read head*

The basic shape of the read head employed in the illustrative embodiment is that of a horseshoe as at 10. This is seen in FIG. 1, and the underlying idea is that the interrogate winding 11 induces a local field in the vicinity of the hole 12 with saturates that area of the horseshoe, thereby increasing the reluctance seen between the pole tips 13 and 14. The saturated area will take the form of a toroid, centered at the hole 12. For this reason, it is clear that the hole 12 should be centered in the width of the horseshoe 10.

In order to utilize the head to read magnetic records, a magnetic dipole is placed between the pole tips to induce a flux in the soft magnetic material. The direction of the flux depends upon the orientation of the dipole. The interrogate winding is then energized, thereby reducing the flux since there is an increase in reluctance of the path. The read winding 15 in FIG. 1 will then have a voltage induced due to the change in flux linkages. The information is carried, then, in the phase of the read voltage.

It should also be pointed out that the same head, as seen in FIG. 1, can serve as a write head simply by energizing the write winding 16. Another possibility is to supply current to a separate winding or, alternatively, the center wire 11*a* of the interrogate winding could be opened and the interrogate winding used to write.

*Head construction*

The head was constructed of Hypersil, a high permeability silicon steel, which was cut approximately 42 mils wide, 235 mils long, and 2 mils thick and thereafter formed into the horseshoe 10. One side of the horseshoe was affixed to a brass backplate as a supporting structure with epoxy glue. Then a 20 mil diameter hole as at 12 was put through the middle of the Hypersil and then on through the brass backplate. Two number 32 enameled copper wires were inserted through the hole 12 from the Hypersil side and soldered to the brass on the back. The interrogate lines 11 thus formed were then brought directly away from the sides of the head and up to the top, being affixed to the brass. The lines were insulated from the brass except where soldered on the back. The lines from what is known as a stripline which serves to contain the field and reduce the noise induced elsewhere.

Next, a 15-turn coil of number 39 enameled copper wire was wound at the top of the horseshoe. This winding was used for both reading and writing. The rest of the Hypersil was then pulled over in front and a 5 mil shim placed between the two pole tips of the horseshoe, which were then faced off to a smooth surface.

*Head operation*

The required interrogation pulse in this head was about one ampere peak and a 3:1 pulse transformer was used. The current required then from the driver was approximately one-third ampere. A pulse of approximately 160 milliamperes appeared to be sufficient into the read winding to write on the magnetic tape with the tape flush against the head.

In the construction of the head, it is advantageous to utilize a material characterized by a B–H curve, where the magnetization and demagnetization traces are substantially coincident, i.e., minimizing the abscissal spacing in the hysteresis loop. This may be achieved through vacuum deposition of Permalloy, with the easy direction along the length of the horseshoe. The Permalloy referred to may be a film $6.0\times10^{-5}$ cm. thick 80–20 (80% nickel, 20% iron).

*Parametron*

In the most elementary possible terms, the parametron is a resonant circuit in which either the inductance or capacitance varies periodically. Neither the capacitor nor inductor variable method seems to exhibit a marked advantage over the other.

The parametron is a special case of the parametric amplifier. The parametric amplifier consists of two tuned circuits coupled through a nonlinear reactance which varies with a pump voltage, or current. The conditions of the tuned circuits must be such that the sum of the resonant frequencies of the two tuned circuits be equal to the pump frequency. The parametron is a special case in which the two tuned circuits are combined into one using an inductor 17 and a capacitor 18. Hence, the resonant frequency of the one tuned circuit must be one-half that of the pump. It is this fact that makes it very useful in application to binary systems. The frequency is fixed, but the phase is quantitized to only one of the two phases which differ by 180°. These two phases then can be used to represent either a "0" or a "1," in binary notation. The representation of information by the phase of a signal is commonly referred to as phase-script. Pulse-script denotes signals representing pulse information. Conversion between phase-script and pulse-script is very conveniently done.

As with most oscillatory circuits, the initial conditions are very important to the build-up of oscillations. In particular, for the parametron, a small voltage induced in the tuned circuit in one of the two second subharmonic phases, prior to application of the pump, will govern the final phase of the oscillation. The final amplitude reached after application of the pump is normally much larger than the small initial voltage. The gain may be of the order of several thousand, i.e., as high as 100 decibels.

*Parametron construction*

Figure 2:
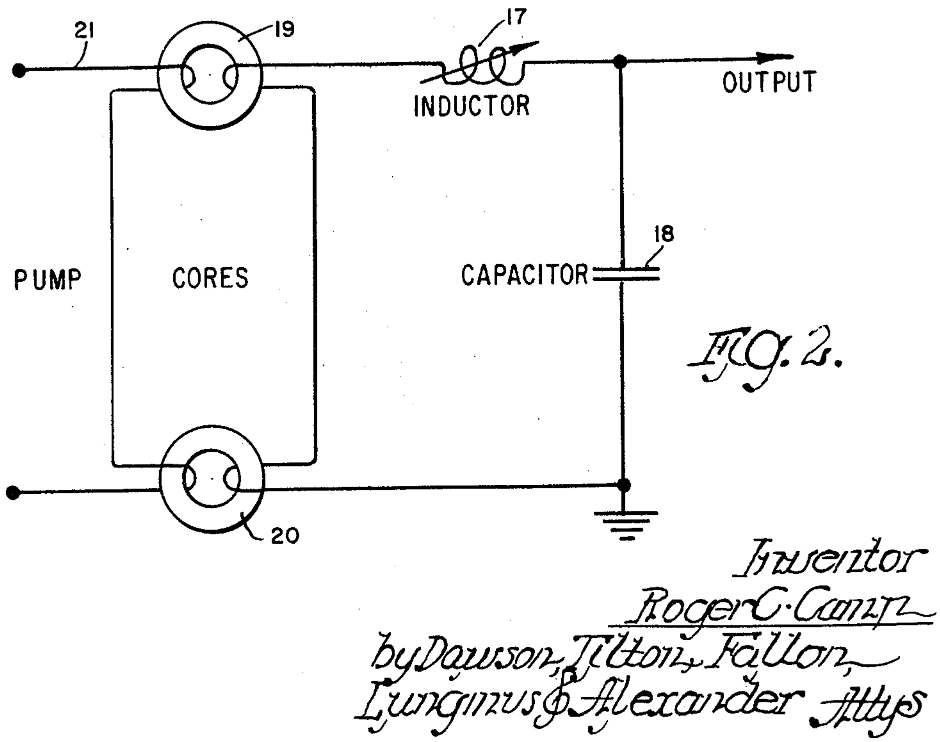
FIG. 2 is a schematic representation of a parametron employed in connection with the head of FIG. 1.

The parametrons employed were constructed of square-loop ferrite cores 19 and 20 (see FIG. 2). These cores are the type normally used in digital computer memory arrays. Specifically, they were S–3 type produced by the General Cereamics Company. These cores have a coercive M.M.F. of approximately 0.262 ampere turn.

During the investigation, it was deemed advantageous to keep the frequencies involved low. This allowed many parts to be built using common laboratory snap-leads, usually without noticeable stray pickup. In the last configuration, the pump frequency applied as at 21 was approximately 50 kilocycles. A difficulty was experienced in going to higher frequencies because of the large switching time of the S–3 cores.

A detailed sketch of the parametron used is shown in FIG. 2. Each core 19 and 20 had wound on it two 15-turn coils of number 30 enameled copper wire. The capacitor 18 was 0.1 microfarad.

Since the differential equations which describe the operation of the parametron are inherently nonlinear, a complete and accurate analysis is not easily made. Grossly, the operation can be analyzed as follows:

*Parametron operation*

For a simple LC resonant circuit with resistance, capacitance, and inductance in parallel, assume that the inductance varies with the pump according to $$L=L_0(1+2a\sin 2\omega t) \quad (1)$$

Also assume that the current in the inductor is sinusoidal and can be broken into a sine and cosine term, such as $$I=I_s\sin\omega t+I_s\cos\omega t \quad (2)$$

The resulting voltage across the inductor is then the time rate of change of LI.

$$\begin{aligned} V_L=&L_0\omega(I_s\cos\omega t-I_c\sin\omega t)\\ &+3aL_0\omega(I_s\sin 3\omega t+I_c\cos 3\omega t) \quad (3)\\ &+aL_0\omega(-I_s\sin\omega t+I_c\cos\omega t) \end{aligned}$$

Since the circuit is tuned to $\omega$, the second term in Equation 3 will be greatly attenuated and hence the inductor voltage will consist of the first and the third terms. The first is easily observed to be the normal voltage leading the current by 90 degrees in time phase. The third term, however, yields a voltage which appears as would a negative resistance, $-aL_0\omega I_s\sin\omega t$. If this equivalent negative resistance is sufficiently large, and can overcome the actual resistance of the inductor, the circuit is seen to exhibit oscillation. Accordingly, a build-up of oscillation will occur until a further non-linearity of the circuit causes limiting.

In the first experiments, the variable inductor was replaced by a fixed 32 microhenry coil at 17 and the pump was supplied from a Hewlett-Packard 211A square wave generator through a 4:1 pulse transformer. The pump frequency was 84 kilocycles.

It is of extreme importance to note that a variation of pick-up voltage amplitude from the read head of as high as 50% should not have any great effect on the performance. The reason is that the parametron is relatively insensitive to amplitude variation so long as it is sufficiently large to establish a particular phase in the output after the pump is turned on.

Several methods for gating the parametron were tried and the best, by far, for experimental work, was shorting the pump winding of the read parametron. Another method is to connect the pump windings in parallel, rather than in series, and opening the pump winding of the read parametron.

*Supplemental circuitry*

Figures 3, 4, 5:
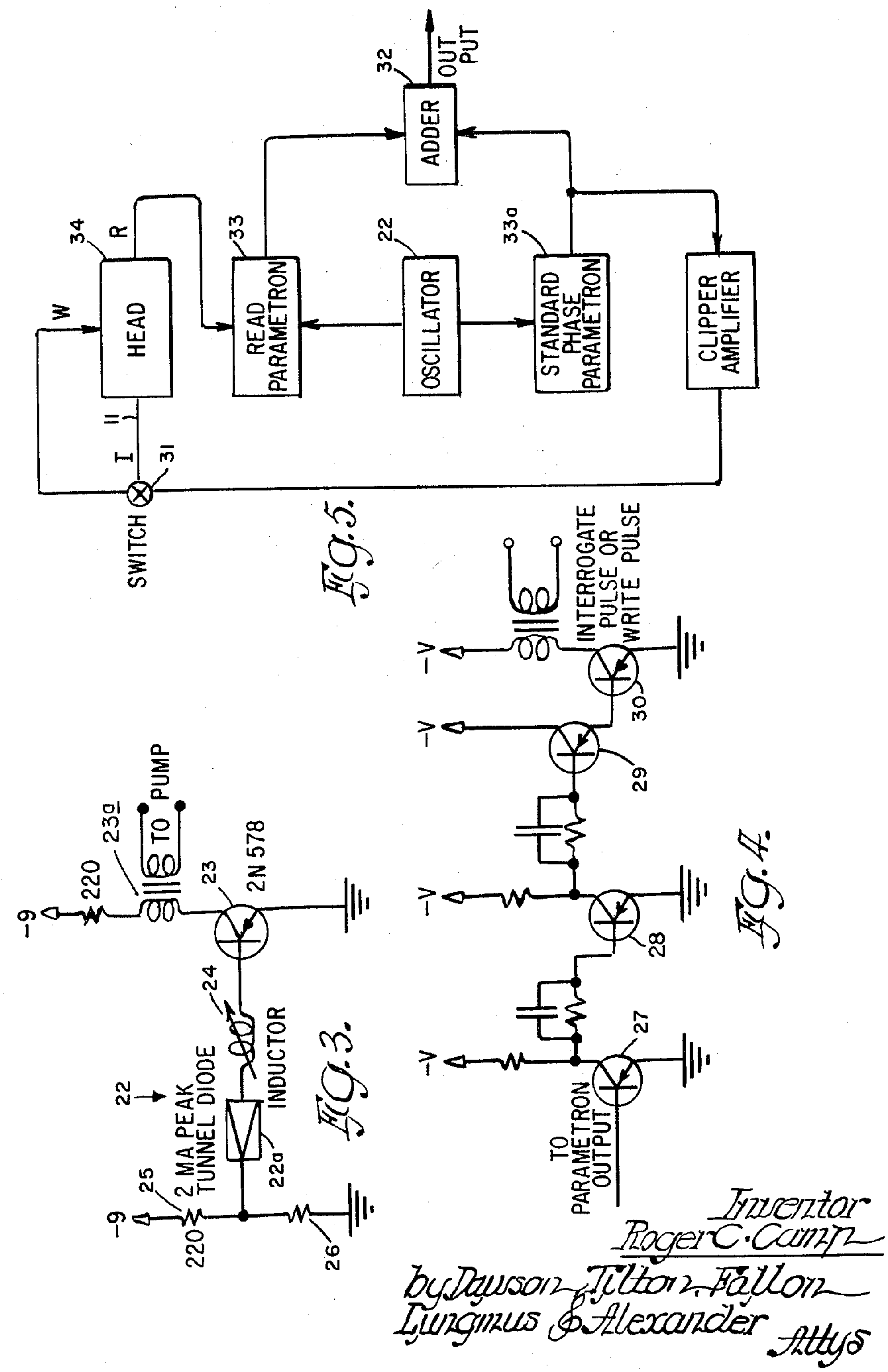
FIGS. 3 and 4 are schematic representations of supplemental circuits employed in connection with the apparatus of FIGS. 1 and 2 and relate to a tunnel diode oscillator and amplifier, and a clipper-amplifier, respectively.
FIG. 5 is a schematic representation of an experimental arrangement of the invention.

A tunnel diode oscillator generally designated 22 and a single transistor amplifier were used to drive the two parametrons in series on the pump windings. The circuit of the oscillator amplifier is shown in FIG. 3. In FIG. 3, the diode 22*a* is seen connected to the transistor 23 by means of an inductor 24. One end of the diode is interconnected between resistors 25 and 26 across which a 9 volt E.M.F. is applied. The output of the transistor is inductively coupled as at 23*a* to the pump 21.

No serious deterioration of operation of the standard phase parametron was observed by coupling directly from the parametron output to the base of a transistor amplifier. The general schematic arrangement of the amplifier is shown in FIG. 4. The clipper-amplifier consists of one stage of voltage amplification as at 27 and then three stages of current amplification as at 28, 29 and 30 to reach the current pulse levels required of the interrogate pulse or the write pulse. It will be apparent to those skilled in the art that other arrangements can be employed. However, the instant arrangement was employed herein since I was particularly concerned with gating of the read parametron. After considerable experimentation, the optimum combination of those tried was found to be the series connection of the pump windings and shorting the read parametron pump to kill the oscillation. Also of some importance was the method of coupling the read voltage from the read head into the parametron. The optimum method was found to be connecting through a pulse transformer whose secondary was placed in series with the parametron resonant circuit.

*Experimental system*

The complete system is shown in FIG. 5. There, the switch 31 diverts the current pulse from the interrogate winding 11 to the read winding 15, which then serves to write on the magnetic tape (not shown). The summing amplifier 32 was actually the Tektronix 561 scope preamplifier which provided an "add" position. However, a simple alternative is to have a single transistor amplifier with two base resistors—one to each parametron output. One or both of the base resistors should be variable to allow for small variations in the two parametrons. Hence, if the two parametrons 33 and 33*a* are in-phase, a large collector current or voltage swing will be experienced. If they are 180° out of phase, no output swing will be observed. The collector could then be used in several ways. One would be to use it into a punch solenoid for punching paper tape or punching cards. Another could be to run a Flexowriter or similar printing equipment. Yet another scheme would be to drive a neon or indicating light.

The output voltage from the read head 34 was run through a 10:1 pulse transformer which was in turn in series with the secondary of parametron 33. With the pump shorted out on the read parametron 33, a voltage at the parametron output of approximately 10 millivolts peak to peak was observed, whose phase was dependent upon which spot on the magnetic tape the read head was positioned over. With the short removed, the signal grew to approximately 1.2 volts.

The proposed scheme gives rise to a system which is considerably less susceptible to noise, and further it offers radical advantages over standard magnetic tape readers in two important ways. First, the acceleration and deceleration of the tape is not important, that is, the read voltage is relatively independent of the tape velocity. Secondly, the associated electronics is simplified.

The inventive system can be used for any data rate from zero up to at least those presently commercially available. The standard magnetic record reading head has a rather severe alteration of voltage spectrum for variation of head-to-recording spacing. Also, very wide variations in amplitude of the output voltage are experienced, approximately 20 to 1 for a spacing of ½ to 2 mils with a 2 mil wide bit. This has a large implication on magnetic disc recording where "run-out" of the disc causes wide variantion in head-to-disc spacing. In contrast, my system is practically insensitive to amplitude variations. The only requirement is that a flux larger than stray flux is captured by the read head. It is also of interest to note that the peak output voltage from the variable reluctance read head varies only approximately three to one over the same separation variation of ½ to 2 mils and a 2 mil bit.

*System construction*

The overall hardware required for a complete magnetic tape system includes:

(1) Tape typewriter
(2) Computer tape input
(3) Computer tape output
(4) Magnetic tape printer All four of these devices are similar in concept to paper tape in both handling and use.

The tape typewriter is currently available from commercial manufacturers. The improvement offered by the variable-reluctance head and parametron scheme is to read all of the material typed on the tape exactly one character position away from the write position. This information can then be used to either actuate the associated typebars or provide a neon lamp visual bit display for operator comparison. The read system is exactly like the tape printer system to be discussed, except that a timing track is unnecessary, since timing is provided by operation of the keys by the typist. A further advantage exists in that a read-without-type can be provided to locate a record to be altered.

Computer tape input and output, the second and third parts of the system, follow conventional lines in existing installations. As indicated previously, considerable cost advantage can be obtained by use of the variable-reluctance head and parametron system. In particular, a much less expensive tape unit is employable, the reduction in cost coming through the relaxation of mechanical requirements over standard tape units.

Fourth is the magnetic tape reader or printer. As presently envisioned, electronic speed is not a problem. The subsystem to be described here involves the use of a timing track 35, although a system can be employed which eliminates this requirement. The only additional requirement is odd tape parity and a logical OR of all levels to trigger the gating. This necessitates increased electronics and hence cost, which would have to be balanced by the user. No major changes in concept are required over this described system, however. The timing track 35 consists of a bit at the location of each recorded character on a separate track. This bit is sensed by a variable reluctance head. Once the signal exceeds a chosen signal level, the read circuitry is reset for the next sequence of operations.

Figure 6:
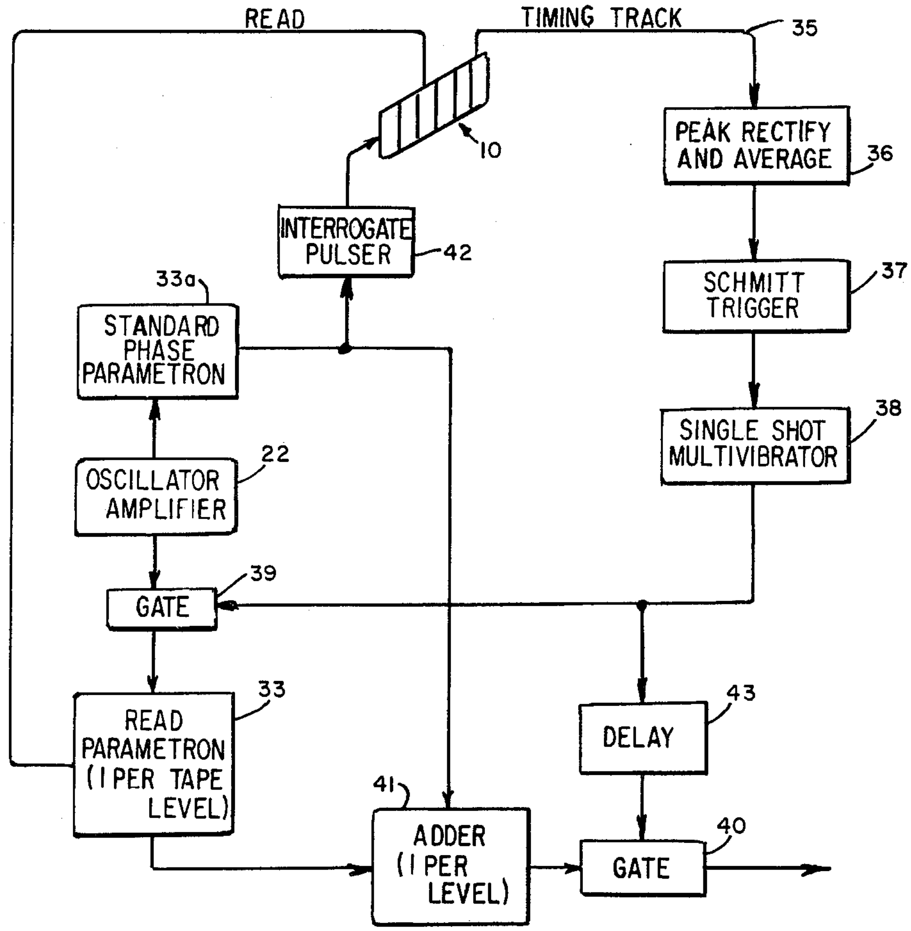
FIG. 6 is a schematic representation of a total reading system employing teachings of the invention.

The read circuitry operation consists of allowing proper build-up in the parametron resonant circuit and then turning on the pump followed by gating the parametron output, after conversion from phase-script to pulse-script, to the printer. The tape then can be accelerated at any convenient rate and reach a steady-state constant velocity, whose resulting character rate is compatible with the chosen printer. The entire read system is shown in FIG. 6. The peak rectifier 36, Schmitt trigger 37, and single-shot multivibrator 38 simply gate the pump as at 39 to the read parametron 33 and gate as at 40 the pulse-script information out of the adder to the printer (not shown). Since this is a read system only, the write feature of the heads has been omitted.

Magnetic tape editing equipment can also be constructed along these same lines. The fundamentals of operation are exactly the same as above described.

By employing variable reluctance read heads and parametrons, the character written could be read back directly from the tape or disc. This system allows 100% checking, so that even flaws on the tape or disc surface can be detected and by-passed. The concept of 100% checking opens new doors in reliability of input-output equipment. It is also to be appreciated that this checking does not require additional heads, the same heads being used for read and write.

Another valuable application of the proposed system is in conversion equipment, as is now in use for conversion between magnetic tape, paper tape, and punched cards. Due to the massive electronics to make the magnetic tape read speed compatible with the other two, this conversion is now relatively expensive. Due to the tape speed independence of the invention, a drastic cost saving can be made in this conversion equipment.

Another area of application is seen to be in searching magnetically-recorded records without the computer. An inventory record could be found, for example, with a magnetic tape reader.

Yet another application is that of telephone line data transmission. A very simple system can be employed in which the computer output, at a centralized location, is made on magnetic tape. This tape is read with my technique and sent over lines to a remote magnetic tape, card, or paper tape station. The receiver station can make use of it in an infinite number of ways—print out, input to another machine, etc.

Such a system may be employed for magnetic tape editing without the necessity of a digital computer for supervision and coordination. Also, since reading is almost independent of tape speed in the invention, the requirement of acceleration and deceleration of magnetic tape units becomes less important.

The inventive procedure, in addition to being virtually amplitude insensitive, is also independent of the relative velocity of record and read head. A further advantage is offered in the electronic implementation by very low cost and simple devices. One of the most important devices is the parametron, which offers phenomenally large voltage gains at very low cost. One of the most important advantages of the inventive system is the reduction in noise sensitivity over conventional systems. The advantage of amplitude insensitivity leads to a very large capacity disc file. At the present state of the art, a billion character disc file is feasible.

In the complete circuit shown in FIG. 6, six heads 10 are illustrated, but it will be appreciated that other numbers of heads may be employed in the practice of the invention. The head is effectively connected by a timing system including the interrogate pulser 42 to the gate 39 for the read parametron 33, the adder 41, which is employed for converting the phase information from the read parametron 33 to pulse amplitude information, and to the gate 40 connecting the adder 41 with the output of the system. A delay mechanism 43 of conventional variety is interposed between the output of the single-shot multivibrator 38 and the gate 40. Here, it will be appreciated that each adder 41 will be equipped with its own delay means 43 and gate 40, depending upon the number of heads employed. As a predetermined point on a magnetic record such as a tape passes the head, a signal is developed through the rectifying trigger and multivibrator elements which gates the signal from the pump (the oscillator amplifier) to the read parametron. At the same time, a signal is delivered, with suitable delay, to the output gate of the adder. Thus, there is established the advantageous precise timed relation between the tape signal and the output signal.

While in the foregoing specification I have set down a detailed description of an embodiment of the invention for the purpose of illustration thereof, many variations in the details herein given may be made by those skilled in the art without departing from the spirit and scope of the invention.

I claim:

A device for sensing magnetic records, comprising means including a variable reluctance head for sensing the information on said magnetic records, a digital computer equipped with a magnetic record disposed adjacent said head, said head being in scanning relation with said record, said record carrying binary phase information, and means including a parametron responsive only to said binary phase information coupled to said head for reporting said information.

References Cited by the Examiner

UNITED STATES PATENTS 2,948,818 8/1960 Goto ---------------- 307—88

OTHER REFERENCES

Daniel: A Flux-Sensitive Reproducing Head for Magnetic Recording Systems, Proceedings of the Inst. of Electrical Engineers, vol. 102, No. B4, pages 442–446, July 1955.

BERNARD KONICK, *Primary Examiner.*

IRVING L. SRAGOW, *Examiner.*